United States Patent
Otsuki et al.

(10) Patent No.: US 10,316,724 B2
(45) Date of Patent: Jun. 11, 2019

(54) FILTER AND EXHAUST GAS CONTROL SYSTEM FOR INTERNAL COMBUSTION ENGINE

(71) Applicant: TOYOTA JIDOSHA KABUSHIKI KAISHA, Toyota-shi, Aichi-ken (JP)

(72) Inventors: Hiroshi Otsuki, Gotenba (JP); Norio Inami, Susono (JP); Kenichi Kohashi, Sunto-gun (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 218 days.

(21) Appl. No.: 15/494,848

(22) Filed: Apr. 24, 2017

(65) Prior Publication Data
US 2017/0314445 A1    Nov. 2, 2017

(30) Foreign Application Priority Data
Apr. 28, 2016    (JP) .................. 2016-091112

(51) Int. Cl.
| | |
|---|---|
| *F01N 3/022* | (2006.01) |
| *F01N 9/00* | (2006.01) |
| *B01D 39/20* | (2006.01) |
| *B01D 46/00* | (2006.01) |
| *F01N 3/023* | (2006.01) |
| *F01N 3/025* | (2006.01) |

(52) U.S. Cl.
CPC ......... *F01N 9/002* (2013.01); *B01D 39/2048* (2013.01); *B01D 46/0063* (2013.01); *F01N 3/023* (2013.01); *F01N 3/0226* (2013.01); *F01N 3/0232* (2013.01); *F01N 3/0253* (2013.01); *B01D 2279/30* (2013.01); *F01N 2330/10* (2013.01); *F01N 2900/1611* (2013.01); *Y02T 10/47* (2013.01)

(58) Field of Classification Search
CPC .......... F01N 9/002; F01N 9/00; F01N 3/0226; F01N 3/023; F01N 3/0232; F01N 3/0253; F01N 2330/10; F01N 2900/1611; B01D 39/2048; B01D 46/0063; B01D 2279/30; Y02T 10/47
USPC .......................................... 60/311
See application file for complete search history.

(56) References Cited

U.S. PATENT DOCUMENTS

2010/0242443 A1    9/2010    Kodama et al.

FOREIGN PATENT DOCUMENTS

| JP | 2008-136936 | 6/2008 |
|---|---|---|
| JP | 2009-138704 | 6/2009 |

*Primary Examiner* — Audrey K Bradley
*Assistant Examiner* — Kelsey L Stanek
(74) *Attorney, Agent, or Firm* — Finnegan, Henderson, Farabow, Garrett & Dunner, LLP

(57) ABSTRACT

A structure of a metal fiber constituting a filter is set to a structure in which a cross-sectional shape of the metal fiber is a curved or bent shape and an outer member and an inner member having a linear expansion coefficient greater than that of the outer member are bonded to each other. Accordingly, the metal fiber is deformed to warp to the outer member side in the length direction thereof when the temperature of the metal fiber increases. When a amount of deformation per unit temperature of the metal fiber is defined as a deformation rate, a amount of change of the deformation rate per unit time changes at a predetermined deformation temperature with the increase in temperature. The deformation temperature is set to a temperature higher than a target temperature of a filter regenerating process.

6 Claims, 11 Drawing Sheets

FILTER AND EXHAUST GAS CONTROL SYSTEM FOR INTERNAL COMBUSTION ENGINE

INCORPORATION BY REFERENCE

The disclosure of Japanese Patent Application No. 2016-091112 filed on Apr. 28, 2016 including the specification, drawings and abstract is incorporated herein by reference in its entirety.

BACKGROUND

1. Technical Field

The disclosure relates to a filter that is disposed in an exhaust gas passage in an internal combustion engine to collect particulate matter (which may be hereinafter referred to as PM) in exhaust gas and an exhaust gas control system for an internal combustion engine including the filter.

2. Description of Related Art

A filter that collects PM in exhaust gas may be disposed in an exhaust gas passage of an internal combustion engine. Here, Japanese Patent Application Publication No. 2008-136936 (JP 2008-136936 A) discloses a filter which is formed as an aggregate of metal fibers as a type of filter which is disposed in an exhaust gas passage of an internal combustion engine. When the filter is formed as an aggregate of metal fibers in this way, there is an advantage that breakage or erosion of the filter is unlikely to occur.

In the filter formed as an aggregate of metal fibers (hereinafter simply referred to as a "filter"), PM is collected in a pore (a void) which is formed between a fiber and a fiber. The size of pores which are formed in the filter is not constant, and pores having a relatively small size or pores having a relatively large size can be formed. Then, PM is collected in the pores having a relatively small size (for example, pores with a diameter equal to or smaller than 5 µm). Hereinafter, pores having such a size to collect PM may be referred to as "small pores." Pores having a size larger than that of the small pores may be referred to as "large pores." The large pores do not collect PM and allow passage of PM therethrough.

In the filter, PM collected in the small pores is gradually accumulated. Therefore, in an exhaust gas control system for an internal combustion engine having the filter, a filter regenerating process of removing PM accumulated in the filter is performed. In the filter regenerating process, a temperature of the filter is increased to a predetermined target temperature at which PM can be oxidized. Accordingly, PM accumulated in the filter is oxidized and removed.

In the filter, ash included in exhaust gas in addition to PM is collected. That is, ash is collected in the small pores in the filter. A main component of PM is a carbon-based component, and a main component of ash is a metal-based component. Accordingly, ash is unlikely to be removed by oxidation even when the temperature of the filter is increased to the target temperature by performing the filter regenerating process. Accordingly, it is difficult to eliminate a state in which ash is accumulated in the filter by the filter regenerating process. When ash is accumulated in the filter, the number of small pores which are clogged with the ash increases. Accordingly, the number of small pores capable of collecting PM decreases. As a result, it is difficult to collect a satisfactory amount of PM in the small pores and there is a possibility of degradation in PM collection performance of the filter.

SUMMARY

The disclosure provides a technique capable of curtailing discharging of PM from a filter which is formed as an aggregate of metal fibers and eliminating a state in which ash is accumulated in the filter.

According an aspect of the disclosure, there is provided a filter configured to collect particulate matter in exhaust gas in an internal combustion engine, the filter being applied to an exhaust gas control system of the internal combustion engine, the exhaust gas control system being configured to perform a filter regenerating process of oxidizing and removing the particulate matter accumulated in the filter by increasing the temperature of the filter to a predetermined target temperature, the filter including: an aggregate of metal fibers, a cross-sectional shape of each metal fiber being a curved shape or a bent shape, each metal fiber including an outer member and an inner member, the outer member and the inner member being bonded to each other such that the outer member is located outside the curved shape or the bent shape and the inner member is located inside the curved shape or the bent shape, a linear expansion coefficient of the inner member being greater than a linear expansion coefficient of the outer member, each metal fiber being configured such that: i) the metal fiber is deformed to warp to the outer member side in a length direction of the metal fiber with an increase in temperature; and ii) an amount of change of a deformation rate changes at a predetermined deformation temperature which is higher than the target temperature with an increase in temperature, the deformation rate being defined as an amount of deformation of the metal fiber per unit time. A degree of curving or a degree of bending of the cross-sectional shape of each metal fiber at an ordinary temperature and a difference between the linear expansion coefficient of the outer member and the linear expansion coefficient of the inner member may be set such that the predetermined deformation temperature is higher than the target temperature.

In the aspect of the disclosure, the cross-sectional shape of each metal fiber constituting the filter is set to a curved or bent shape. The metal fiber has a structure in which the outer member located outside the curved shape or the bent shape of the cross-section and the inner member located inside the curved shape or the bent shape of the cross-section are bonded to each other. The outer member and the inner member extend in the length direction of the metal fiber. The linear expansion coefficient of the inner member is set to be greater than the linear expansion coefficient of the outer member.

Due to the difference in linear expansion coefficient between the outer member and the inner member, a thermal stress is applied to the metal fibers when the temperature of the metal fibers (that is, the temperature of the filter) increases. As a result, each metal fiber is deformed to warp to the outer member side in the length direction thereof.

Since the cross-sectional shape of each metal fiber is a curved shape or a bent shape, the metal fiber has relatively high stiffness with respect to bending. That is, the metal fiber has relatively high stiffness with respect to warpage in the length direction thereof. Accordingly, when the temperature of the metal fibers increases but stays relatively low (that is, when a thermal stress is relatively small), an amount of deformation (which may be hereinafter referred to as an "amount of warpage deformation") in which the metal fiber warps to the outer member side is relatively small. However, when the temperature of the metal fibers increases further, the curved shape or the bent shape as the cross-sectional shape is broadened in a width direction thereof (a direction perpendicular to the length direction). That is, the degree of curving or the degree of bending in the cross-sectional shape of the metal fiber decreases with the increase in temperature. When the degree of curving or the degree of bending in the cross-sectional shape of the metal fiber decreases, the stiffness with respect to bending (that is, the stiffness with respect to warpage in the length direction) of the metal fiber decreases.

In this way, when the temperature of the metal fibers increases, the thermal stress applied to the metal fiber increases but the stiffness with respect to warpage in the length direction of the metal fiber decreases. Accordingly, when the temperature of the metal fibers according to the disclosure increases, the amount of warpage deformation rapidly increases at a certain temperature. Here, when the amount of warpage deformation of the metal fiber per unit temperature is defined as a deformation rate, the deformation rate of the metal fiber rapidly increases at a certain temperature with the increase in temperature of the metal fiber. That is, the metal fibers according to the disclosure have a structure in which the amount of change of the deformation rate per unit temperature changes at a predetermined deformation temperature with the increase in temperature of the metal fibers.

The deformation temperature has a high correlation with the degree of curving or the degree of bending at an ordinary temperature of the cross-sectional shape of each metal fiber and the difference between the linear expansion coefficient of the outer member and the linear expansion coefficient of the inner member. Therefore, in the metal fiber according to the disclosure, the degree of curving or the degree of bending at an ordinary temperature of the cross-sectional shape of each metal fiber and the difference between the linear expansion coefficient of the outer member and the linear expansion coefficient of the inner member are set such that the deformation temperature is higher than the target temperature of the filter regenerating process.

According to the filter including such metal fibers, when the temperature of the filter increases to a temperature higher than the deformation temperature, the metal fiber is deformed to greatly warp in the length direction thereof. As a result, a small pore formed between metal fiber and a metal fiber in the filter can increase in size. When the size of the small pore increases, ash collected in the small pore is likely to escape from the small pore (the small pore which has increased in size). Accordingly, it is possible to discharge ash from the filter.

In the filter according to the aspect of the disclosure, the deformation temperature of the metal fiber is higher than the target temperature of the filter regenerating process. Accordingly, even when the temperature of the filter increases to the target temperature in the filter regenerating process, the amount of warpage deformation of the metal fiber is relatively small. That is, during execution of the filter regenerating process, the size of small pores is unlikely to increase. Accordingly, it is possible to prevent PM collected in the small pores from not being oxidized and escaping from the small pores. As a result, it is possible to prevent PM from not being oxidized and being discharged from the filter during execution of the filter regenerating process.

In this way, in the filter according to the aspect of the disclosure, it is possible to eliminate a state in which ash is accumulated while preventing PM from being discharged from the filter.

An aspect of the disclosure may be understood as an exhaust gas control system for an internal combustion engine including a filter configured to include metal fibers and a regenerating process executing unit configured to perform a filter regenerating process.

The exhaust gas control system for an internal combustion engine according to the aspect of the disclosure may further include a discharging process executing unit configured to perform an ash discharging process after the filter regenerating process is completed by the regenerating process executing unit. In the ash discharging process, the metal fibers are deformed by increasing the temperature of the filter to a temperature higher than the deformation temperature and thus ash accumulated in the filter is discharged from the filter.

After the filter regenerating process is completed, most PM accumulated in the filter is removed. That is, almost only ash is accumulated in the filter. Accordingly, by performing the ash discharging process after the filter regenerating process is completed, it is possible to prevent PM from being discharged together when ash is discharged from the filter.

An amount of ash included in exhaust gas of the internal combustion engine is much smaller than an amount of PM. Accordingly, an amount of ash accumulated in the filter is much smaller than an amount of PM accumulated in the filter. Therefore, the discharging process executing unit may perform the ash discharging process whenever the filter regenerating process is performed a predetermined number of times by the regenerating process executing unit.

The discharging process executing unit may increase and decrease the temperature of the filter a plurality of times in a temperature range which is higher than the deformation temperature when performing the ash discharging process. Accordingly, during execution of the ash discharging process, the change of the amount of warpage deformation is repeated a plurality of times in a state in which the metal fiber greatly warps. As a result, ash accumulated in the filter can be easily discharged from the filter. The aspect of the disclosure may be defined as follows. According to the aspect of the disclosure, there is provided an exhaust gas control system for an internal combustion engine, the exhaust gas control system including: a filter configured to collect particulate matter in exhaust gas in the internal combustion engine, the filter including an aggregate of metal fibers, a cross-sectional shape of each metal fiber being a curved shape or a bent shape, each metal fiber including an outer member and an inner member, the outer member and the inner member being bonded to each other such that the outer member is located outside the curved shape or the bent shape and the inner member is located inside the curved shape or the bent shape, a linear expansion coefficient of the inner member being greater than a linear expansion coefficient of the outer member, each metal fiber being configured such that i) the metal fiber is deformed to warp to the outer member side in a length direction of the metal fiber with an increase in temperature; and ii) an amount of change of a deformation rate changes at a predetermined deformation temperature which is higher than the target temperature with an increase in temperature, the deformation rate being defined as an amount of deformation of the metal fiber per unit time; and an electronic control unit configured to perform a filter regenerating process of oxidizing and removing the particulate matter accumulated in the filter by increasing the temperature of the filter to a predetermined target temperature. The electronic control unit may be configured to perform an ash discharging process of discharging ash accumulated in the filter from the filter by increasing the temperature of the filter to a temperature higher than the predetermined deformation temperature to deform the metal fibers after the filter regenerating process is completed. The electronic control unit may be configured to perform the ash discharging process when the filter regenerating process is performed a predetermined number of times. The electronic control unit may be configured to perform the ash discharging process such that the temperature of the filter changes a plurality of times in a temperature range which is higher than the predetermined deformation temperature.

According to the aspect of the disclosure, it is possible to suppress discharging of PM from a filter which is formed as an aggregate of metal fibers and to eliminate a state in which ash is accumulated in the filter.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, exemplary embodiments of the disclosure will be described with reference to the accompanying drawings. The sizes, materials, shapes, relative arrangement, and the like of constituent components described in the embodiments are not intended to limit the technical scope of the disclosure thereto unless otherwise specified.

First Embodiment

Schematic Configuration of Exhaust System

Figure 1:
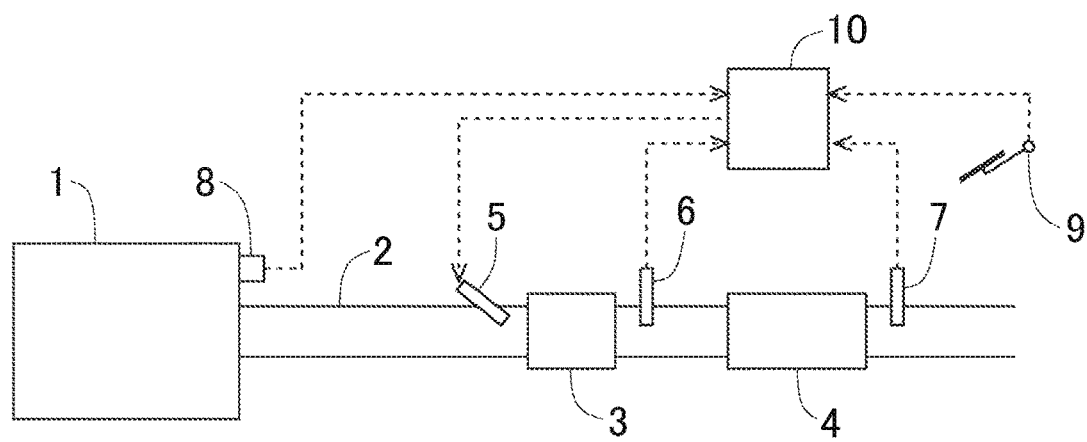
FIG. 1 is a diagram schematically illustrating a configuration of an exhaust system of an internal combustion engine according to an embodiment of the disclosure.

FIG. 1 is a diagram schematically illustrating a configuration of an exhaust system of an internal combustion engine according to a first embodiment of the disclosure. An internal combustion engine 1 is a diesel engine for driving a vehicle. An exhaust gas passage 2 is connected to the internal combustion engine 1.

In the exhaust gas passage 2, an oxidation catalyst 3 and a filter 4 are sequentially arranged along a flow of exhaust gas from an upstream side. The filter 4 collects PM included in exhaust gas. The filter 4 is constituted as an aggregate of metal fibers (for example, a woven fabric or a nonwoven fabric of metal fibers). A detailed configuration of the filter 4 will be described later.

A fuel addition valve 5 is disposed in the exhaust gas passage 2 upstream from the oxidation catalyst 3. The fuel addition valve 5 adds fuel to exhaust gas flowing in the exhaust gas passage 2. An upstream temperature sensor 6 is disposed in the exhaust gas passage 2 downstream from the oxidation catalyst 3 and upstream from the filter 4. A downstream temperature sensor 7 is disposed in the exhaust gas passage 2 downstream from the filter 4. The upstream temperature sensor 6 detects the temperature of exhaust gas flowing out of the oxidation catalyst 3. The downstream temperature sensor 7 detects the temperature of exhaust gas flowing out of the filter 4.

An electronic control unit (ECU) 10 is installed in the internal combustion engine 1. The ECU 10 is a unit that controls an operation state of the internal combustion engine 1 or the like. The upstream temperature sensor 6 and the downstream temperature sensor 7 are electrically connected to the ECU 10. Various sensors such as a crank position sensor 8 and an accelerator position sensor 9 are electrically connected to the ECU 10. The crank position sensor 8 is a sensor that outputs an electrical signal corresponding to a rotational position of an output shaft (a crank shaft) of the internal combustion engine 1. The accelerator position sensor 9 is a sensor that outputs an electrical signal corresponding to an amount of stepping on an accelerator pedal of the vehicle having the internal combustion engine 1 mounted thereon (an accelerator opening level). The output signals of the sensors are input to the ECU 10. The ECU 10 estimates a temperature of the oxidation catalyst 3 on the basis of a value detected by the upstream temperature sensor 6. The ECU 10 estimates a temperature of the filter 4 on the basis of a value detected by the downstream temperature sensor 7. The ECU 10 estimates an engine rotation speed of the internal combustion engine 1 on the basis of a value detected by the crank position sensor 8. The ECU 10 estimates an engine load of the internal combustion engine 1 on the basis of a value detected by the accelerator position sensor 9. Various units such as a fuel injection valve (not illustrated) and a fuel addition valve 5 of the internal combustion engine 1 are electrically connected to the ECU 10. Various units are controlled by the ECU 10.

For example, the ECU 10 performs a filter regenerating process of oxidizing and removing PM accumulated in the filter 4 by adding fuel to exhaust gas from the fuel addition valve 5. When fuel is added from the fuel addition valve 5, the fuel is supplied to the oxidation catalyst 3. The temperature of exhaust gas increases due to heat of oxidation generated due to oxidation of fuel in the oxidation catalyst 3. When the exhaust gas flows into the filter 4 and the temperature of the filter 4 increases to a first target temperature at which PM can be oxidized, PM accumulated in the filter 4 is oxidized and removed.

(Configuration of Filter)

Figure 2:
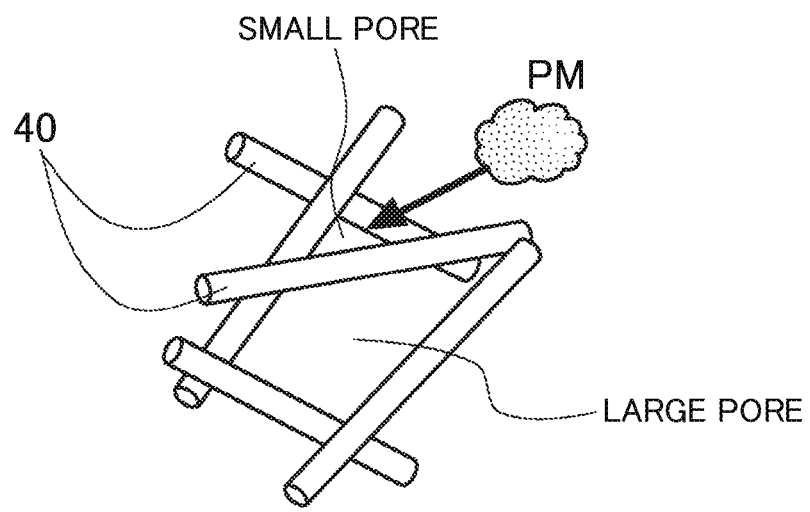
FIG. 2 is an enlarged view of a filter according to the embodiment of the disclosure.
Figure 3:
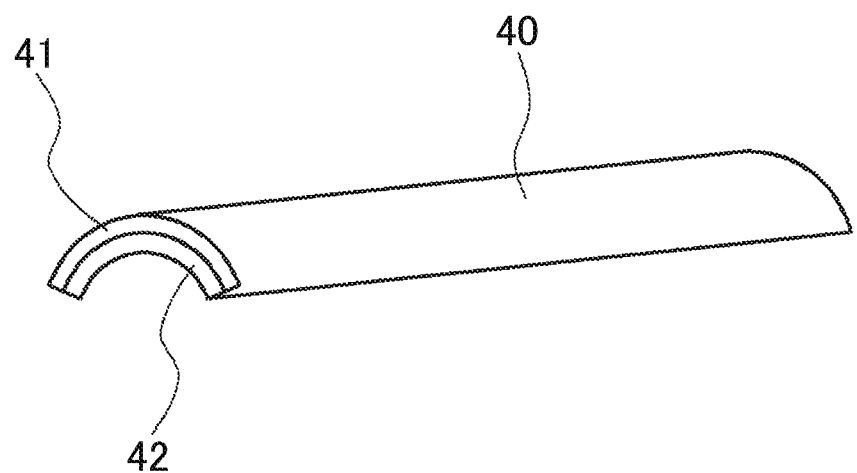
FIG. 3 is a perspective view schematically illustrating a configuration of a metal fiber constituting the filter according to the embodiment of the disclosure.

A configuration of the filter according to this embodiment will be described below with reference to FIGS. 2 and 3. FIG. 2 is an enlarged view of the filter. In FIG. 2, for the purpose of convenience, a cross-sectional shape of each metal fiber 40 is schematically illustrated. FIG. 3 is a perspective view schematically illustrating a configuration of each metal fiber constituting the filter. As described above, the filter 4 is formed as an aggregate of metal fibers 40. In the filter 4, a pore is formed between a metal fiber 40 and a metal fiber 40. Here, in the filter 4, small pores which are pores having such a size to collect PM and large pores which are pores having a size larger than that of the small pores can be formed as illustrated in FIG. 2. PM in exhaust gas is collected in the small pores in the filter 4.

Each metal fiber 40 constituting the filter 4 has an arc cross-sectional shape as illustrated in FIG. 3. That is, the cross-sectional shape of each metal fiber 40 is a curved shape. The metal fiber 40 has a structure in which an outer member 41 located outside the arc shape and an inner member 42 located inside the arc shape are bonded to each other. The outer member 41 and the inner member 42 are different in linear expansion coefficient. That is, the linear expansion coefficient of the inner member 42 is set to be greater than the linear expansion coefficient of the outer member 41. Here, SUS410 (with a linear expansion coefficient of 10.4) can be exemplified as a metal material of the outer member 41. SUS304 (with a linear expansion coefficient of 17.3) can be exemplified as a metal material of the inner member 42.

Figure 4:
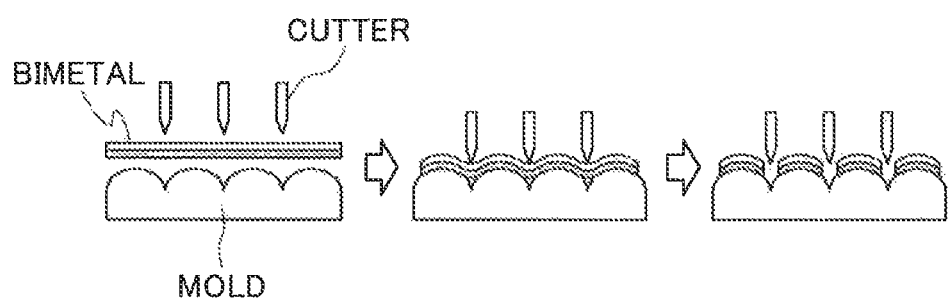
FIG. 4 is a diagram illustrating a method of manufacturing a metal fiber according to the embodiment of the disclosure.

A method of manufacturing a metal fiber 40 having the above-mentioned structure will be described below in brief with reference to FIG. 4. First, a bimetal is manufactured by bonding the metal material of the outer member 41 and the metal material of the inner member 42, and the bimetal is rolled in a predetermined thickness. Then, as illustrated in FIG. 4, the rolled bimetal is pressed against a mold having a plurality of convex portions having an arc shape and the bimetal is cut at positions between the convex portions and the convex portions using a cutter. At this time, the bimetal is pressed against the mold such that the metal material of the inner member 42 comes in contact with the convex portions of the mold. Accordingly, the bimetal is shaped in a fiber shape of which the cross-sectional shape is an arc shape. The fiber-like bimetal is shaped in a metal fiber with a desired thickness by stretching the bimetal while maintaining the arc cross-sectional shape, and the resultant is cut in a desired length. By this method, metal fibers 40 with a desired thickness and a desired length are manufactured.

Figure 5:
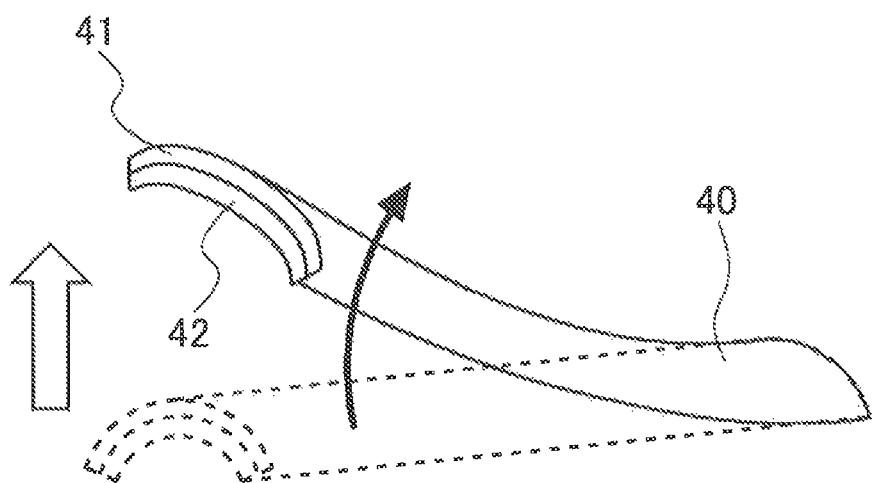
FIG. 5 is a diagram illustrating a state in which a metal fiber is deformed with an increase in temperature according to the embodiment of the disclosure.

Deformation of a metal fiber 40 with an increase in temperature will be described below with reference to FIG. 5. When the temperature of a metal fiber 40 (that is, the temperature of the filter 4) increases due to the difference in linear expansion coefficient between the outer member 41 and the inner member 42 as described above, a thermal stress acting in a direction indicated by an outline arrow in FIG. 5 is generated in the metal fiber 40. As a result, the metal fiber 40 is deformed to warp to the outer member 41 in the length direction thereof as indicated by a solid arrow in FIG. 5.

Figure 6:
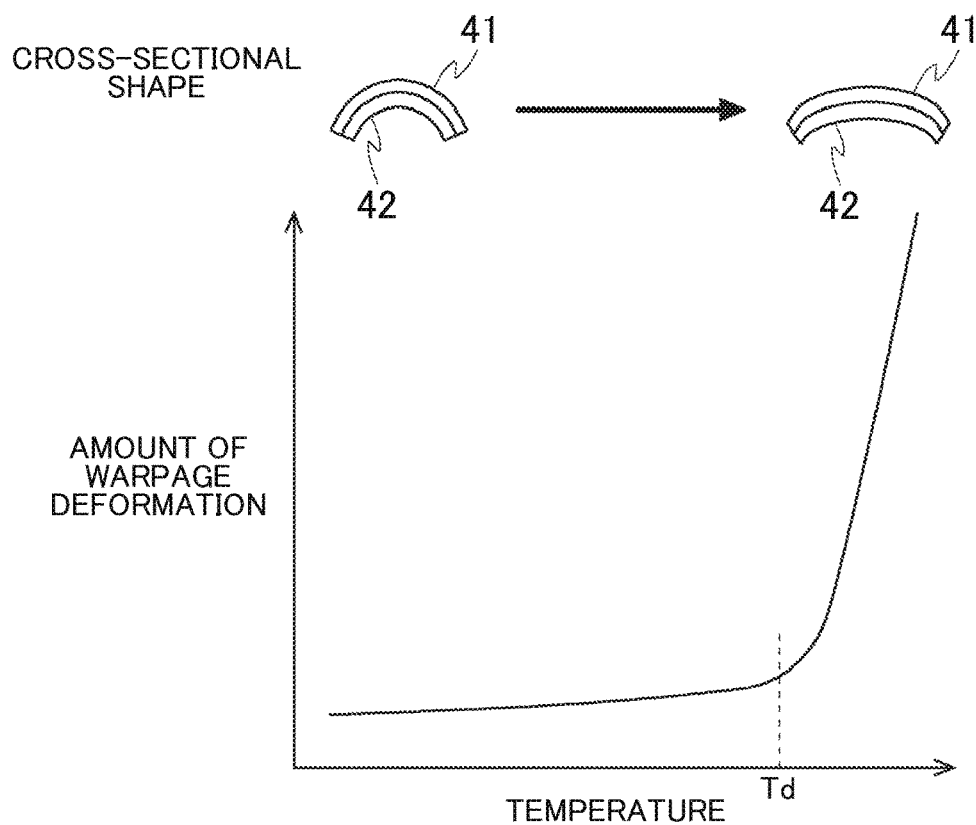
FIG. 6 is a diagram illustrating a correlation between the temperature of a metal fiber, an amount of warpage deformation of the metal fiber, and a cross-sectional shape of the metal fiber according to the embodiment of the disclosure.

Since the cross-sectional shape of the metal fiber 40 is an arc shape, the metal fiber 40 has relatively high stiffness with respect to bending. That is, the metal fiber 40 has relatively high stiffness with respect to warpage in the length direction thereof. Now, a change of an amount of deformation (an amount of warpage deformation) in which the metal fiber 40 warps to the outer member 41 with a change in temperature of the metal fiber 40 will be described with reference to FIG. 6. FIG. 6 is a diagram illustrating a correlation between the temperature of a metal fiber, an amount of warpage deformation of the metal fiber, and a cross-sectional shape of the metal fiber. In the graph illustrated in FIG. 6, the horizontal axis represents the temperature of the metal fiber 40 and the vertical axis represents the amount of warpage deformation. The diagram illustrated in the upper part of FIG. 6 illustrates the cross-sectional shape of the metal fiber 40 with respect to the temperature of the metal fiber 40.

Since the cross-sectional shape of the metal fiber 40 is an arc shape as described above, the stiffness with respect to warpage in the length direction thereof is relatively high. Accordingly, as illustrated in the graph of FIG. 6, when the temperature of the metal fiber 40 is relatively low, the amount of warpage deformation is relatively small. As illustrated in the upper part of FIG. 6, when the temperature of the metal fiber 40 increases, the arc shape of the cross-section is broadened in the width direction thereof (the direction perpendicular to the length direction). That is, a degree of curving in the cross-sectional shape of the metal fiber 40 decreases with the increase in temperature. When the degree of curving in the cross-sectional shape of the metal fiber 40 decreases, the stiffness with respect to warpage of the metal fiber 40 (the stiffness with respect to bending in the length direction thereof) decreases.

In this way, as the temperature of the metal fiber 40 increases, the thermal stress applied to the metal fiber 40 increases, but the stiffness with respect to warpage in the length direction of the metal fiber 40 decreases. Accordingly, as illustrated in FIG. 6, when the temperature of the metal fiber 40 becomes higher than a certain temperature (a temperature Td in the graph of FIG. 6), the amount of warpage deformation rapidly increases. When the amount of warpage deformation of the metal fiber 40 per unit temperature is defined as a deformation rate, the deformation rate of the metal fiber 40 rapidly increases at the temperature Td with the increase in temperature of the metal fiber 40. That is, an amount of change of the deformation rate per unit temperature in the metal fiber 40 is changed at the temperature Td. When the temperature Td in the graph of FIG. 6 is defined as a deformation temperature, the metal fiber 40 according to this embodiment has a structure in which the amount of change of the deformation rate per unit temperature changes at a predetermined deformation temperature Td with the increase in temperature thereof.

Figure 7:
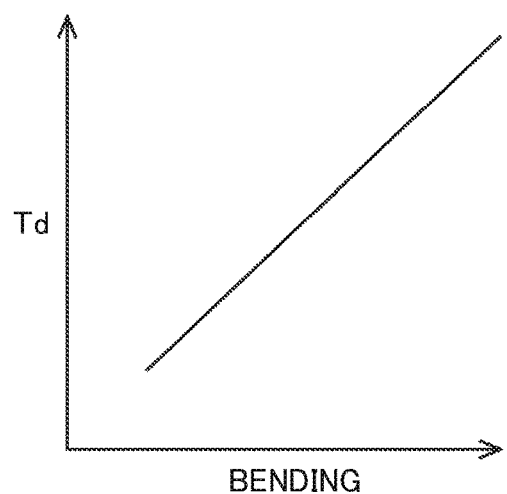
FIG. 7 is a diagram illustrating a correlation between a curvature of a cross-sectional shape at an ordinary temperature of a metal fiber and a deformation temperature Td according to the embodiment of the disclosure.
Figure 8:
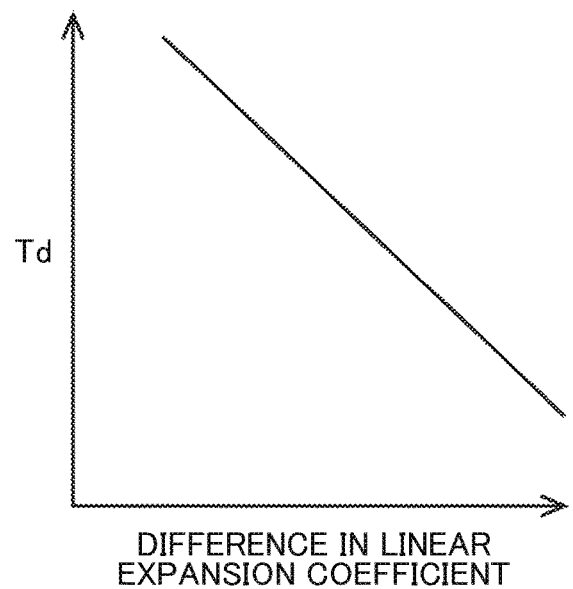
FIG. 8 is a diagram illustrating a correlation between a difference between a linear expansion coefficient of an outer member and a linear expansion coefficient of an inner member in a metal fiber and a deformation temperature Td according to the embodiment of the disclosure.

The curvature (that is, the degree of curving) at an ordinary temperature of the cross-sectional shape of the metal fiber 40 is correlated with the stiffness with respect to warpage in the length direction thereof. The difference between the linear expansion coefficient of the outer member 41 and the linear expansion coefficient of the inner member 42 in the metal fiber 40 is correlated with the thermal stress generated with the increase in temperature. Accordingly, the deformation temperature Td has a high correlation with the curvature at an ordinary temperature of the cross-sectional shape in the metal fiber 40 and the difference between the linear expansion coefficient of the outer member 41 and the linear expansion coefficient of the inner member 42. FIG. 7 is a diagram illustrating a correlation between the curvature at an ordinary temperature of the cross-sectional shape of the metal fiber and the deformation temperature Td. In FIG. 7, the horizontal axis represents a curvature at an ordinary temperature of the cross-sectional shape of the metal fiber 40 and the vertical axis represents a deformation temperature Td. FIG. 8 is a diagram illustrating a correlation between the difference between the linear expansion coefficient of the outer member and the linear expansion coefficient of the inner member in a metal fiber and the deformation temperature Td. In FIG. 8, the horizontal axis represents a difference between the linear expansion coefficient of the outer member 41 and the linear expansion coefficient of the inner member 42 in the metal fiber 40 and the vertical axis represents a deformation temperature Td.

As the curvature at an ordinary temperature of the cross-sectional shape of the metal fiber 40 increases (that is, as the degree of curving increases), the stiffness with respect to warpage in the length direction thereof increases. Accordingly, as illustrated in FIG. 7, as the curvature at an ordinary temperature of the cross-sectional shape of the metal fiber 40 increases, the deformation temperature Td increases. As the difference between the linear expansion coefficient of the outer member 41 and the linear expansion coefficient of the inner member 42 in the metal fiber 40 increases, the thermal stress generated with the increase in temperature increases. Accordingly, as illustrated in FIG. 8, as the difference between the linear expansion coefficient of the outer member 41 and the linear expansion coefficient of the inner member 42 in the metal fiber 40 increases, the deformation temperature Td decreases. Accordingly, by setting the curvature at an ordinary temperature of the cross-sectional shape of the metal fiber 40 and the difference between the linear expansion coefficient of the outer member 41 and the linear expansion coefficient of the inner member 42 in consideration of the correlations, it is possible to obtain a metal fiber 40 having a desired deformation temperature Td. Therefore, in this embodiment, the curvature at an ordinary temperature of the cross-sectional shape and the difference between the linear expansion coefficient of the outer member 41 and the linear expansion coefficient of the inner member 42 are set such that the deformation temperature Td of the metal fiber 40 reaches a temperature higher than a first target temperature which is a target temperature in the filter regenerating process.

Operations and advantages based on setting the structure of each metal fiber 40 constituting the filter 4 to the above-mentioned structure will be described below. Ash included in exhaust gas along with PM is collected in the filter 4. That is, ash is also collected in small pores of the filter 4. Since a main component of ash is a metal-based component, it is difficult to remove ash by oxidation even when the temperature of the filter 4 increases to the first target temperature by performing the above-mentioned filter regenerating process. Accordingly, even when the PM collected in the small pores is oxidized and removed by performing the filter regenerating process, ash remains in the small pores. As a result, when ash is accumulated in the filter 4, the number of small pores clogged with the ash increases. Accordingly, the number of small pores capable of collecting PM decreases. As a result, it is difficult to collect a satisfactory amount of PM using the small pores and there is a possibility of degradation in PM collection performance of the filter 4. Accordingly, in order to suppress the degradation in PM collection performance of the filter 4, it is necessary to remove ash accumulated in the filter 4, that is, ash collected in the small pores.

Therefore, in this embodiment, the structure of each metal fiber 40 constituting the filter 4 is set to a structure with the deformation temperature Td higher than the first target temperature in the filter regenerating process to enable removal of ash accumulated in the filter 4. In this embodiment, the filter 4 is set to such a structure and then an ash discharging process of discharging ash accumulated in the filter 4 from the filter 4 is performed. In the ash discharging process, the metal fiber 40 is deformed by increasing the temperature of the filter 4 to a second target temperature which is a temperature higher than the deformation temperature Td of the metal fiber 40 as the temperature higher than the first target temperature in the filter regenerating process, and thus ash accumulated in the filter 4 is discharged from the filter 4.

Figure 9:
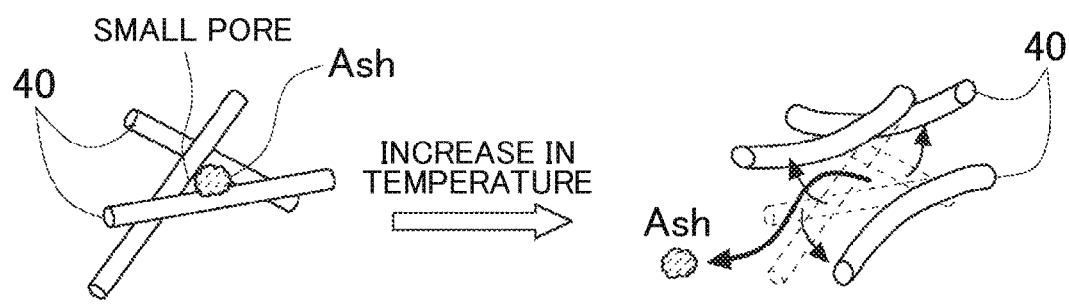
FIG. 9 is a diagram illustrating a state in which metal fibers in the filter are deformed when an ash discharging process is performed according to the embodiment of the disclosure.

FIG. 9 is a diagram illustrating a state in which a metal fiber in the filter is deformed when the ash discharging process is performed. In FIG. 9, the cross-sectional shapes of metal fibers 40 are simplified for the purpose of convenience, but the original cross-sectional shapes of the metal fibers 40 are the same as the shape illustrated in FIG. 5. Since the temperature of the metal fibers 40 are higher than the deformation temperature Td in the ash discharging process, the metal fibers 40 are deformed to greatly warp in the length direction thereof. As a result, as illustrated in FIG. 9, the size of a small pore formed between a metal fiber 40 and a metal fiber 40 in the filter 4 can increase. When the size of the small pore increases, ash collected in the small pore can escape easily out of the small pore (the small pore of which the size has increased). Accordingly, it is possible to discharge ash from the filter 4. As a result, it is possible to eliminate the state in which ash is collected in the filter 4.

As described above, the deformation temperature Td of the metal fibers 40 is set to a temperature higher than the first target temperature in the filter regenerating process. Accordingly, even when the temperature of the filter 4 increases to the first target temperature by performing the filter regenerating process, the amount of warpage deformation of the metal fibers 40 is relatively small. That is, during execution of the filter regenerating process, the size of the small pores is unlikely to increase. Accordingly, during execution of the filter regenerating process, it is possible to prevent PM collected in the small pores from escaping from the small pores without being oxidized. As a result, it is possible to prevent PM from being discharged from the filter 4 during execution of the filter regenerating process.

In this way, by setting the structure of the metal fiber 40 to the above-mentioned structure, it is possible to suppress the amount of warpage deformation to an amount of deformation with which the size of the small pores can be maintained in such a size in which PM is unlikely to escape therefrom when the temperature is equal to or lower than the deformation temperature Td. On the other hand, when the temperature is higher than the deformation temperature Td, the amount of warpage deformation increases up to an amount of deformation with which the size of the small pores can be enlarged to a size in which ash can escape therefrom. Accordingly, by setting the structure of the metal fiber 40 to the above-mentioned structure, it is possible to prevent PM from being discharged from the filter 4 and to eliminate the state in which ash is accumulated.

During execution of the filter regenerating process, the temperature of the filter 4 may be higher than the first target temperature due to heat of oxidation of PM. Accordingly, in view of the viewpoint in which discharging of PM from the filter 4 is suppressed during execution of the filter regenerating process, it is preferable that the deformation temperature Td of the metal fiber 40 be set to a temperature higher than a highest value of the temperature of the filter 4 which the temperature of the filter can be expected to reach due to the heat of oxidation of PM during execution of the filter regenerating process.

When execution of the ash discharging process is stopped and the temperature of the metal fiber 40 is lower than the deformation temperature Td, the amount of warpage deformation of the metal fiber 40 decreases. Accordingly, the small pores of the filter 4 which have been enlarged during execution of the ash discharging process decrease. As a result, the PM collection performance of the filter 4 is recovered to the same extent as before the ash discharging process is performed.

(Flows of Filter Regenerating Process and Ash Discharging Process)

Figure 10:
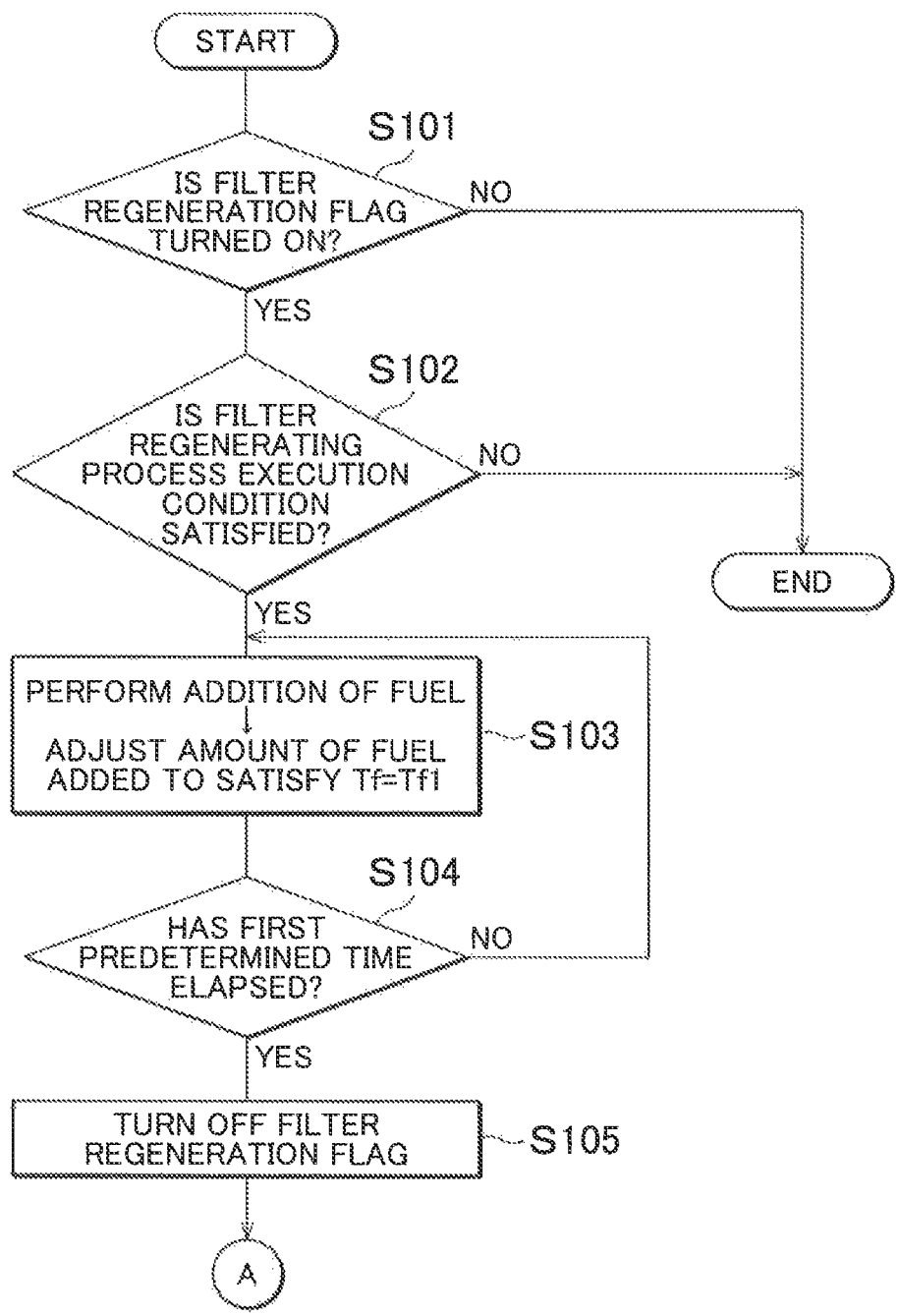
FIG. 10 is a flowchart illustrating a process flow of a filter regenerating process according to a first embodiment of the disclosure.
Figure 11:
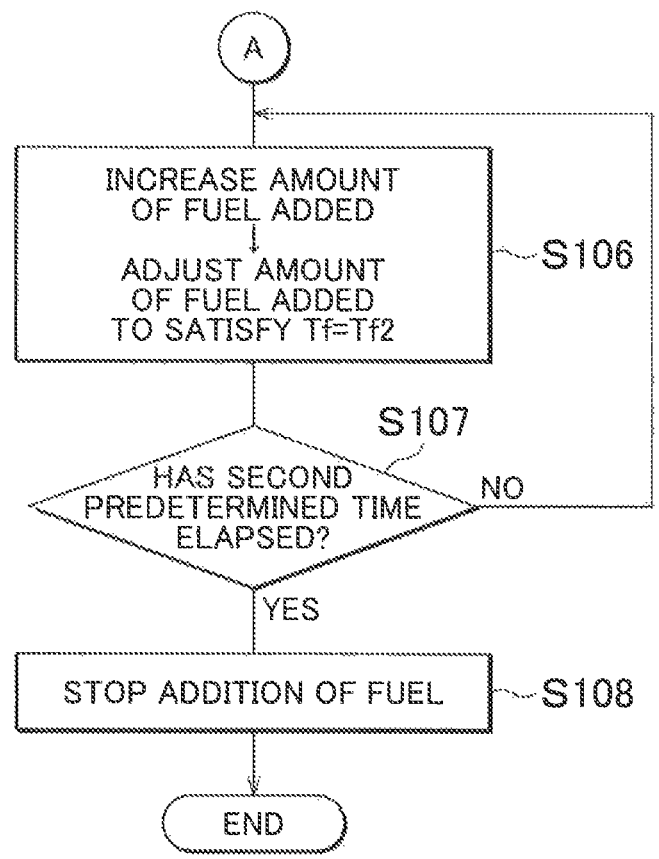
FIG. 11 is a flowchart illustrating a process flow of an ash discharging process according to the first embodiment of the disclosure.

Here, when PM is accumulated in the filter 4 at the time of execution of the ash discharging process, there is a possibility that some PM as well as ash will be discharged from the filter 4 without being oxidized. Therefore, in this embodiment, the ash discharging process is performed after the filter regenerating process is completed. Flows of the filter regenerating process and the ash discharging process according to this embodiment will be described below with reference to FIGS. 10 and 11. The flows illustrated in FIGS. 10 and 11 are stored in the ECU 10 in advance and are performed by a program stored in the ECU 10.

In the flow, it is first determined in S101 whether a filter regeneration flag stored in the ECU 10 is turned on. The filter regeneration flag is a flag which is turned on when an amount of PM accumulated in the filter 4 is equal to or greater than a predetermined amount. The amount of PM accumulated in the filter 4 can be calculated by adding an amount of PM collected (an increase of the amount of PM accumulated) in the filter 4, which is estimated on the basis of the operation state of the internal combustion engine 1 and the temperature of the filter 4, and the like and an amount of PM oxidized (a decrease of the amount of PM accumulated). Therefore, the ECU 10 frequently calculates the amount of PM accumulated in the filter 4 by performing a flow other than this flow. When the calculated amount of PM accumulated is equal to or greater than a predetermined amount, the filter regeneration flag is turned on.

When the determination result of S101 is negative, that is, when the filter regeneration flag stored in the ECU 10 is turned off, execution of this flow ends once. On the other hand, when the determination result of S101 is positive, the process of S102 is performed. In S102, it is determined whether a predetermined filter regenerating process execution condition is satisfied. Examples of the filter regenerating process execution condition include a condition in which the temperature of the oxidation catalyst 3 is equal to or higher than an activation temperature and a condition in which the operation state of the internal combustion engine 1 is stabled.

When the determination result of S102 is negative, that is, when the filter regenerating process execution condition is not satisfied, execution of this flow ends once. On the other hand, when the determination result of S102 is positive, the process of S103 is performed. In S103, addition of fuel to exhaust gas by the fuel addition valve 5 is performed to perform the filter regenerating process. An amount of fuel added from the fuel addition valve 5 is adjusted such that the temperature Tf of the filter 4 reaches the first target temperature Tf1. As described above, the first target temperature Tf1 is a temperature at which PM can be oxidized and is a temperature which is determined in advance on the basis of experiment or the like. When the temperature Tf of the filter 4 reaches the first target temperature Tf1, PM accumulated in the filter 4 is oxidized and removed.

Then, in S104, it is determined whether a first predetermined time elapses after addition of fuel to exhaust gas by the fuel addition valve 5 is started, that is, after execution of the filter regenerating process is started. Here, the first predetermined time is a time in which PM accumulated in the filter 4 can be satisfactorily removed by performing the filter regenerating process for the first predetermined time. The first predetermined time can be determined in advance on the basis of experiment or the like.

When the determination result of S104 is negative, the process of S103 is performed again. That is, the filter regenerating process is continuously performed. On the other hand, when the determination result of S104 is positive, the filter regeneration flag stored in the ECU 10 is turned off in S105. Accordingly, execution of the filter regenerating process is completed.

In S106 subsequent to S105, an amount of fuel added from the fuel addition valve 5 increases to perform the ash discharging process. The amount of fuel added from the fuel addition valve 5 is adjusted such that the temperature Tf of the filter 4 reaches the second target temperature Tf2. As described above, the second target temperature Tf2 is a temperature which is higher than the first target temperature Tf1 in the filter regenerating process and is a temperature which is higher than the deformation temperature Td of the metal fibers 40. The second target temperature Tf2 is determined in advance on the basis of experiment or the like. When the filter 4 reaches the second target temperature Tf2, the metal fibers 40 are deformed to greatly warp in the length direction thereof and thus the small pores between metal fibers 40 and metal fibers 40 in the filter 4 are enlarged, as illustrated in FIG. 9. Ash collected in the small pores is discharged from the filter 4.

Then, in S107, it is determined whether a second predetermined time elapses after execution of the filter regenerating process is completed and the amount of fuel added from the fuel addition valve 5 increases, that is, after execution of the ash discharging process is started. Here, the second predetermined time is a time in which it can be determined that ash collected in the filter 4 can be satisfactorily removed by performing the ash discharging process for the second predetermined time. The second predetermined time can be determined in advance on the basis of experiment or the like.

When the determination result of S107 is negative, the process of S106 is performed again. That is, the ash discharging process is continuously performed. On the other hand, when the determination result of S107 is positive, the addition of fuel to exhaust gas by the fuel addition valve 5 is stopped in S108. That is, execution of the ash discharging process is stopped.

According to the above-mentioned flow, the ash discharging process is performed after the execution of the filter regenerating process is completed. Accordingly, the ash discharging process is performed in a state in which most PM accumulated in the filter 4 is removed and almost only ash is accumulated in the filter 4. Accordingly, it is possible to prevent PM from being discharged from the filter 4 together with ash.

In the above-mentioned flow, the temperature of the filter 4 is increased to the second target temperature by increasing the amount of fuel added from the fuel addition valve 5 in the state in which the temperature of the filter 4 is increased to the first target temperature by performing the filter regenerating process. Accordingly, it is possible to curtail an amount of fuel added from the fuel addition valve 5 for realizing the ash discharging process. As a result, it is possible to suppress degradation in fuel efficiency with execution of the ash discharging process.

In this embodiment, the regenerating process executing unit according to the disclosure is embodied by causing the ECU 10 to perform the processes of S103 and S104 in the above-mentioned flow. In this embodiment, the discharging process executing unit according to the disclosure is embodied by causing the ECU 10 to perform the processes of S106 and S107 in the above-mentioned flow.

In this embodiment, the filter regenerating process and the ash discharging process are realized by causing the fuel addition valve 5 to add fuel to exhaust gas. However, by causing a fuel injection timing in the internal combustion engine 1 to lag or performing post injection after main fuel injection in the internal combustion engine 1, the temperature of exhaust gas discharged from the internal combustion engine 1 is increased to increase the temperature of the filter 4 to the target temperatures in the processes, thereby realizing the processes.

Second Embodiment

The configurations of the exhaust system and the filter in the internal combustion engine according to a second embodiment are the same as in the first embodiment. In this embodiment, similarly to the first embodiment, the filter regenerating process and the ash discharging process are performed. This embodiment is different from the first embodiment in an execution frequency of the ash discharging process.

An amount of ash included in exhaust gas in the internal combustion engine 1 is much smaller than an amount of PM. Accordingly, an amount of ash accumulated in the filter 4 is much smaller than an amount of PM accumulated in the filter 4. Accordingly, it is not necessary to perform the ash discharging process when execution of the filter regenerating process is completed. Therefore, in this embodiment, the ash discharging process is performed whenever the filter regenerating process is performed a predetermined number of times.

Figure 12:
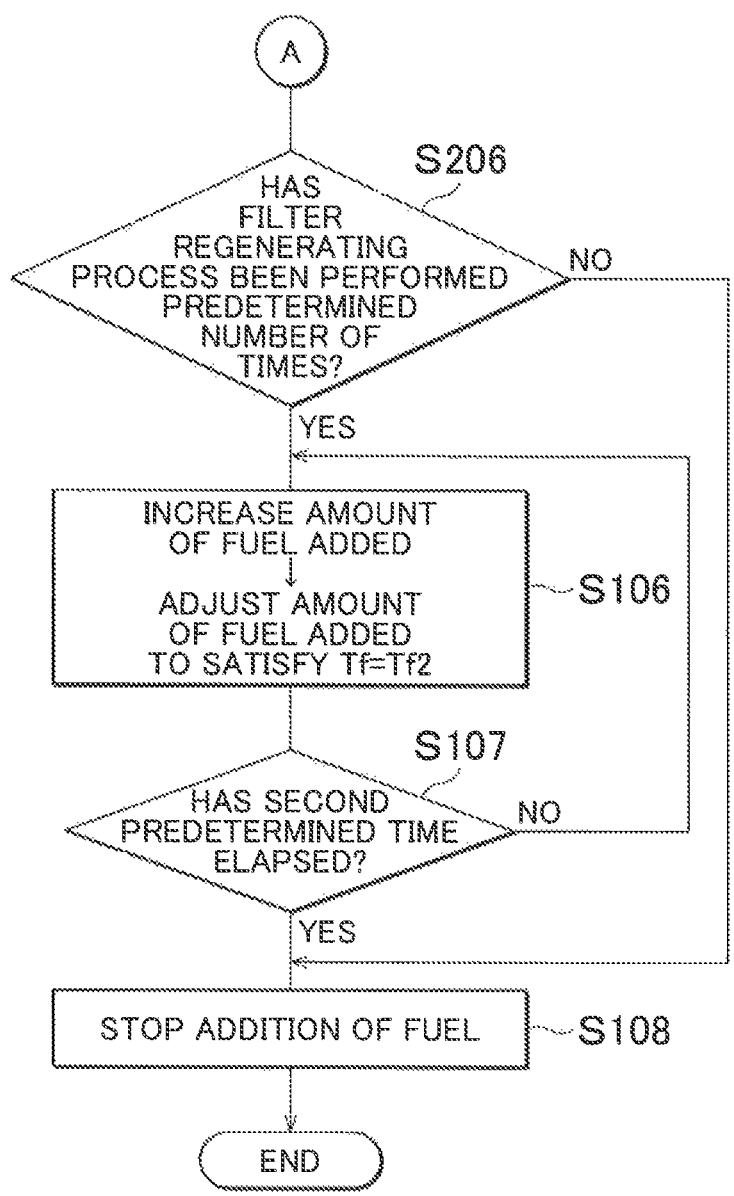
FIG. 12 is a flowchart illustrating a process flow of an ash discharging process according to a second embodiment of the disclosure.

The ash discharging process according to this embodiment will be described below with reference to FIG. 12. In this embodiment, the flow (the processes of S101 to S105) of the filter regenerating process illustrated in FIG. 10 is performed in the same way as in the first embodiment. The processes of S106 to S108 in the flow illustrated in FIG. 12 are performed in the same way as the processes in the flow illustrated in FIG. 11. Accordingly, description of the processes will not be repeated. In this embodiment, the flows illustrated in FIGS. 10 and 12 are stored in advance in the ECU 10 and are performed by a program stored in the ECU 10.

In this embodiment, the process of S206 in the flow illustrated in FIG. 12 is performed after the process of S105 in the flow illustrated in FIG. 10 is performed. In S206, it is determined whether the filter regenerating process is performed a predetermined number of times after the previous ash discharging process has been completely performed. The predetermined number of times is two or more times and is the number of times in which such an amount of ash to be removed is accumulated in the filter 4 when the filter regenerating process is performed the predetermined number of times without performing the ash discharging process. Such a predetermined number of times can be determined in advance on the basis of experiment or the like. The execution frequency of the filter regenerating process is counted by a counter stored in the ECU 10. The execution frequency of the filter regenerating process counted by the counter is reset when the ash discharging process is performed.

When the determination result of S206 is negative, that is, when the execution frequency of the filter regenerating process after the previous ash discharging process is completely performed does not reach a predetermined number of times, the process of S108 is performed. That is, execution of the addition of fuel to exhaust gas from the fuel addition valve 5 is stopped without performing the ash discharging process. Accordingly, the execution of the filter regenerating process is stopped. On the other hand, when the determination result of S206 is positive, the process subsequent to S106 is performed. That is, the ash discharging process is performed.

According to the above-mentioned flow, the ash discharging process is performed whenever the filter regenerating process is performed a predetermined number of times. Accordingly, it is possible to decrease the execution frequency of the ash discharging process in comparison with the case in which the ash discharging process is performed when the filter regenerating process is completely performed. Accordingly, it is possible to suppress degradation in fuel efficiency due to the execution of the ash discharging process.

Third Embodiment

The configurations of the exhaust system and the filter in the internal combustion engine according to a third embodiment are the same as in the first embodiment. In this embodiment, similarly to the first embodiment, the filter regenerating process and the ash discharging process are performed. This embodiment is different from the first embodiment, in that the temperature of the filter 4 is increased and decreased when performing the ash discharging process.

In this embodiment, when performing the ash discharging process, the temperature of the filter 4 is increased to the second target temperature Tf2 by setting the amount of fuel added from the fuel addition valve 5 to be greater than that when performing the filter regeneration flag. In the ash discharging process according to this embodiment, the amount of fuel added from the fuel addition valve 5 is periodically increased and decreased such that the temperature of the filter 4 is increased and decreased a plurality of times in a range equal to or higher than the second target temperature Tf2.

Accordingly, the temperature of the metal fibers 40 is increased and decreased in a range higher than the deformation temperature Td. When the temperature of the metal fibers 40 is changed in a temperature range higher than the deformation temperature Td, an amount of warpage deformation of each metal fiber 40 greatly changes with the change in temperature. Accordingly, when the temperature of the metal fibers 40 is increased and decreased a plurality of times in the temperature range higher than the deformation temperature Td, the change of the amount of warpage deformation is repeated a plurality of times in a state in which the metal fibers 40 greatly warp. As a result, during execution of the ash discharging process, enlargement and reduction of the small pores in the filter 4 are repeated. Accordingly, ash collected in the small pores can easily escape from the small pores. As a result, it is possible to easily discharge ash accumulated in the filter 4 from the filter 4.

Figure 13:
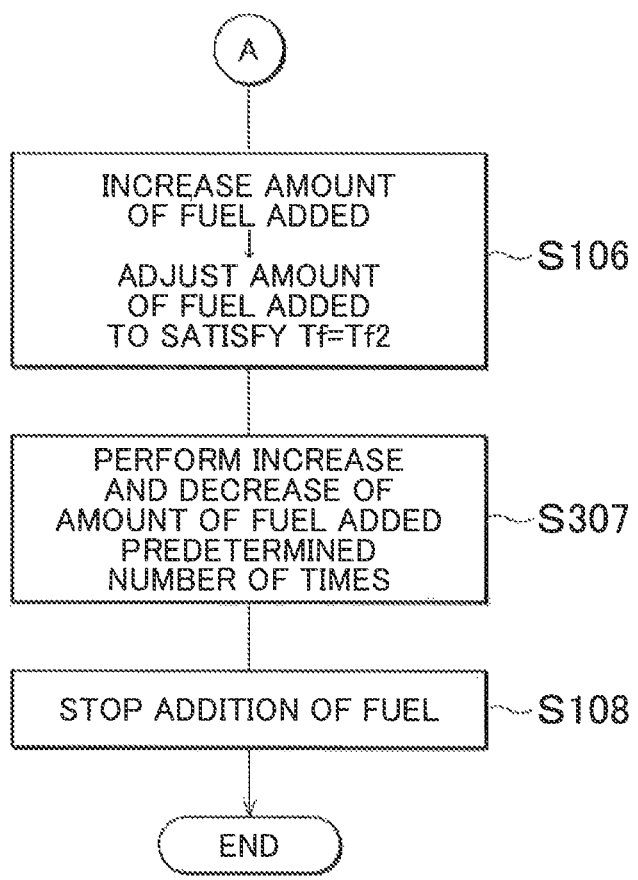
FIG. 13 is a flowchart illustrating a process flow of an ash discharging process according to a third embodiment of the disclosure.

The ash discharging process according to this embodiment will be described below with reference to FIG. 13. In this embodiment, the flow (the processes of S101 to S105) of the filter regenerating process illustrated in FIG. 10 is performed in the same way as in the first embodiment. The processes of S106 and S108 in the flow illustrated in FIG. 13 are performed in the same way as the processes in the flow illustrated in FIG. 11. Accordingly, description of the processes will not be repeated. In this embodiment, the flows illustrated in FIGS. 10 and 13 are stored in advance in the ECU 10 and are performed by a program stored in the ECU 10.

In this embodiment, the process of S307 is performed subsequent to S106. In S307, the amount of fuel added from the fuel addition valve 5 is increased and decreased a predetermined number of times in a range equal to or greater than the amount of fuel added from the fuel addition valve 5 at that time in the first embodiment or second embodiment. At this time, the increase and decrease of the amount of fuel added from the fuel addition valve 5 is performed with such a cycle to follow the temperature change of the filter 4 with the increase and decrease of the amount of fuel added. That is, the amount of fuel added is decreased after the temperature of the filter 4 is increased by increasing the amount of fuel added. The amount of fuel added is increased after the temperature of the filter 4 is decreased by decreasing the amount of fuel added. The predetermined number of times which is an increasing and decreasing frequency of the amount of fuel added is the number of times in which it can be determined to satisfactorily remove ash accumulated in the filter 4 by repeating the temperature change of the filter 4 with the increase and decrease of the amount of fuel added the predetermined number of times. The predetermined number of times can be determined in advance on the basis of experiment or the like. The process of S108 is performed subsequent to S307 and the execution of the ash discharging process is stopped.

According to the above-mentioned flow, when performing the ash discharging process, the temperature of the filter 4 is increased and decreased a predetermined number of times in a temperature range higher than the deformation temperature Td. As a result, the amount of change of the amount of warpage deformation of the metal fibers 40 is repeated the predetermined number of times. In this embodiment, by causing the ECU 10 to perform the processes of S106 and S307 in the above-mentioned flow, the discharging process executing unit according to the disclosure is embodied. The ash discharging process according to this embodiment can also be applied to the second embodiment in which the ash discharging process is performed whenever the filter regenerating process is performed a plurality of times.

Modified Example

In the first to third embodiments, the cross-sectional shape of each metal fiber 40 constituting the filter 4 is set to an arc shape as illustrated in FIG. 3. However, the cross-sectional shape of each metal fiber according to the disclosure is not limited to the arc shape. For example, the cross-sectional shape of each metal fiber may be set to a curved shape other than the arc shape. In this case, as a degree of curving at an ordinary temperature of the cross-sectional shape of each metal fiber increases, the deformation temperature of the metal fiber increases.

Figure 14:
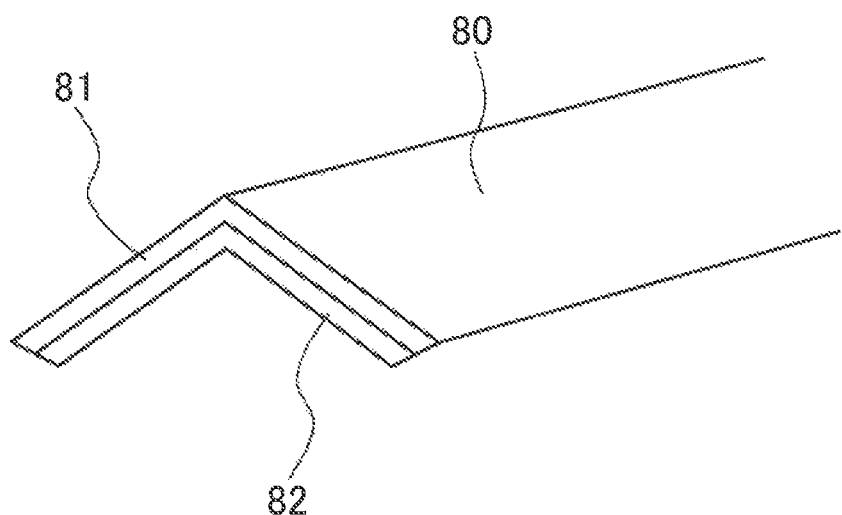
FIG. 14 is a perspective view schematically illustrating a configuration of a metal fiber constituting a filter according to a modified example of the embodiment of the disclosure.

The cross-sectional shape of each metal fiber may be set to a bent shape instead of the curved shape. FIG. 14 is a perspective view schematically illustrating a configuration of each metal fiber constituting the filter according to a modified example of the embodiments. As illustrated in FIG. 14, the cross-sectional shape of a metal fiber 80 according to the modified example is a bent shape. In such a shape, the metal fiber 80 has a structure in which an outer member 81 located outside the bent shape and an inner member 82 located inside the bent shape are bonded to each other. The linear expansion coefficient of the inner member 82 is set to be greater than the linear expansion coefficient of the outer member 81.

In this way, when the cross-sectional shape of the metal fiber 80 is set to the bent shape, the stiffness of the metal fiber 80 to bending is relatively high. That is, the metal fiber 80 has relatively high stiffness with respect to warpage in the length direction thereof. However, when the temperature of the metal fiber 80 increases, the bent shape is broadened in the width direction (the direction perpendicular to the length direction). That is, a degree of bending of the cross-sectional shape of the metal fiber 80 decreases with an increase in temperature (that is, a bending angle increases). When the degree of bending of the cross-sectional shape of the metal fiber 80 decreases, the stiffness of the metal fiber 80 to warpage in the length direction thereof decreases. Accordingly, even when the cross-sectional shape is set to the bent shape like the metal fiber 80, the metal fiber 80 has a structure in which the amount of change of the deformation rate per unit temperature changes depending on a predetermined deformation temperature with the increase in temperature, similarly to the case in which the cross-sectional shape is set to a curved shape.

Figure 15:
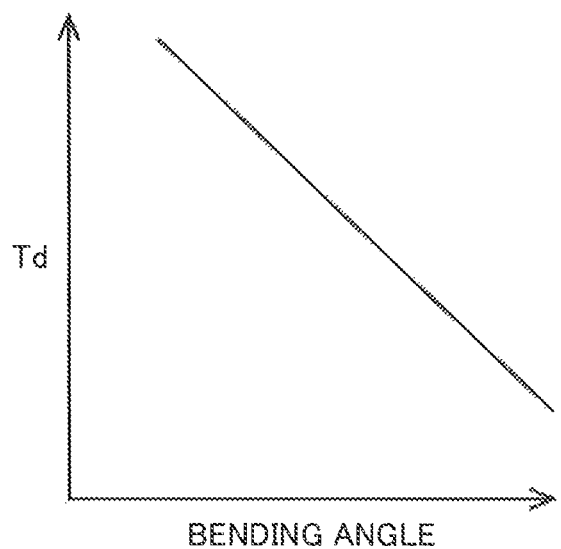
FIG. 15 is a diagram illustrating a correlation between a bending angle of a cross-sectional shape at an ordinary temperature of a metal fiber and a deformation temperature Td according to a modified example of the embodiment of the disclosure.

The deformation temperature has a high correlation with the bending angle (that is, the amount of bending) at an ordinary temperature of the cross-sectional shape of the metal fiber 80 and the difference between the linear expansion coefficient of the outer member 81 and the linear expansion coefficient of the inner member 82. FIG. 15 is a diagram illustrating a correlation between the bending angle at an ordinary temperature of the cross-sectional shape of the metal fiber 80 and the deformation temperature Td. In FIG. 15, the horizontal axis represents a bending angle at an ordinary temperature of the cross-sectional shape of the metal fiber 80 and the vertical axis represents a deformation temperature Td. As illustrated in FIG. 15, as the bending angle at an ordinary temperature of the cross-sectional shape of the metal fiber 80 decreases (that is, as the degree of bending increases), the deformation temperature Td increases. Similarly to the case in which the cross-sectional shape is set to a curved shape, as the difference between the linear expansion coefficient of the outer member 81 and the linear expansion coefficient of the inner member 82 in the metal fiber 80 increases, the deformation temperature Td decreases (see FIG. 8). Therefore, in the metal fiber 80, the bending angle at an ordinary temperature of the cross-sectional shape and the difference between the linear expansion coefficient of the outer member 81 and the linear expansion coefficient of the inner member 82 are set such that the deformation temperature Td reaches a temperature higher than the first target temperature which is a target temperature in the filter regenerating process. By setting the metal fiber 80 to this structure, it is possible to obtain the same advantages as in the first to third embodiments.

What is claimed is:

1. A filter configured to collect particulate matter in exhaust gas in an internal combustion engine, the filter being applied to an exhaust gas control system of the internal combustion engine, the exhaust gas control system being configured to perform a filter regenerating process of oxidizing and removing the particulate matter accumulated in the filter by increasing the temperature of the filter to a predetermined target temperature, the filter comprising an aggregate of metal fibers, a cross-sectional shape of each metal fiber being a curved shape or a bent shape, each metal fiber including an outer member and an inner member, the outer member and the inner member being bonded to each other such that the outer member is located outside the curved shape or the bent shape and the inner member is located inside the curved shape or the bent shape, a linear expansion coefficient of the inner member being greater than a linear expansion coefficient of the outer member, each metal fiber being configured such that i) the metal fiber is deformed to warp to the outer member side in a length direction of the metal fiber with an increase in temperature; and ii) an amount of change of a deformation rate changes at a predetermined deformation temperature which is higher than the target temperature, with an increase in temperature, the deformation rate being defined as an amount of deformation of the metal fiber per unit time.

2. The filter according to claim 1, wherein a degree of curving or a degree of bending of the cross-sectional shape of each metal fiber at an ordinary temperature and a difference between the linear expansion coefficient of the outer member and the linear expansion coefficient of the inner member are set such that the predetermined deformation temperature is higher than the target temperature.

3. An exhaust gas control system for an internal combustion engine, the exhaust gas control system comprising:

a filter configured to collect particulate matter in exhaust gas in the internal combustion engine, the filter including an aggregate of metal fibers, a cross-sectional shape of each metal fiber being a curved shape or a bent shape, each metal fiber including an outer member and an inner member, the outer member and the inner member being bonded to each other such that the outer member is located outside the curved shape or the bent shape and the inner member is located inside the curved shape or the bent shape, a linear expansion coefficient of the inner member being greater than a linear expansion coefficient of the outer member, each metal fiber being configured such that i) the metal fiber is deformed to warp to the outer member side in a length direction of the metal fiber with an increase in temperature; and ii) an amount of change of a deformation rate changes at a predetermined deformation temperature which is higher than the target temperature, with an increase in temperature, the deformation rate being defined as an amount of deformation of the metal fiber per unit time; and an electronic control unit configured to perform a filter regenerating process of oxidizing and removing the particulate matter accumulated in the filter by increasing the temperature of the filter to a predetermined target temperature.

4. The exhaust gas control system according to claim 3, wherein the electronic control unit is configured to perform an ash discharging process of discharging ash accumulated in the filter from the filter by increasing the temperature of the filter to a temperature higher than the predetermined deformation temperature to deform the metal fibers after the filter regenerating process is completed.

5. The exhaust gas control system according to claim 4, wherein the electronic control unit is configured to perform the ash discharging process when the filter regenerating process is performed a predetermined number of times.

6. The exhaust gas control system according to claim 4, wherein the electronic control unit is configured to perform the ash discharging process such that the temperature of the filter changes a plurality of times in a temperature range which is higher than the predetermined deformation temperature.

* * * * *